3,335,100
POLYMERS OF SULFONIUM AND QUATERNARY AMMONIUM MOIETIES
Gerald R. Geyer, Midland, Mich., assignor to The Dow Chemical Company, Midland, Mich., a corporation of Delaware
No Drawing. Filed July 5, 1963, Ser. No. 293,158
2 Claims. (Cl. 260—2.1)

The present invention relates to a novel polymers containing a plurality of interpolymerized quaternary ammonium and sulfonium moieties. More particularly, the invention involves providing novel, water-soluble polyalkane polymers, with the mixed onium moieties, subject to insolubilization upon thermal treatment.

Within recent years considerable attention has been given to the development of water-insoluble, but bibulous membranes permselective to the passage of ions. One of the methods whereby such membranes are prepared is to polymerize ethylenically unsaturated, ionic monomers in the presence of a minor proportion of a cross-linking monomer, e.g., divinylbenzene, whereby a cross-linked, water-insoluble, but yet bibulous, gel is obtained. This gel is then sliced into thin membranes to provide electroconductive but ion selective diaphragms for dialysis operations. It would be desirable to prepare such membranes by casting films from aqueous solutions of an insoluble membrane forming resin.

A desideratum of the electrographic printing paper art is to provide electroconductive base coatings which can be applied from an aqueous solution to both sides of the paper. Since most electroconductive materials are water soluble, to use such materials as a base coat under a photoconductive coating applied from an aqueous system causes leaching of the earlier applied electroconductive coating into the photoconductive coating. This results in a diminishing of the printability of the paper and a general weakening of the image obtained.

It is, therefore, desirable, and an object of the invention, to provide a water-soluble, polyalkane backbone resin suitable for the preparation of water-insoluble electroconductive paper coatings. A further object is to provide an electroconductive resin conveniently applied to electrographic paper from an aqueous system, e.g., as by addition to the aqueous cellulose fiber slurry feed stock for a paper machine or by direct application to the preformed paper. An example of the latter technique is passing the paper through a dip solution of the polymer.

In other paper manufacturing operations, there are occasions when it is desirable, and it is an object of the invention, to increase the wet strength of paper while at the same time minimizing the extent of sizing in the paper.

Still another object is to provide a resin suitable for the preparation of water-insoluble, but bibulous, membranes selective to the passage of anions for dialysis operations.

A polymer composition has now been discovered which has most efficacious application to the afore-described purposes. This polymer is a water-soluble, polyalkane backbone polymer containing in polymerized form, polymerization being through vinylidene groups, a plurality of each of monoethylenically unsaturated monomers defined by the following Formulas A and B. These monomers are present in proportions of about 0.1 to about 9 parts by weight of the former for each part by weight of the latter with the overall limitation that the combined total of A and B constitutes at least 60 mole percent of the polymerized moieties forming the polyalkane. Other copolymerizable compounds defined by Formula C can be included in amounts up to 40 mole percent if desired. "Water-soluble," as employed herein to characterize the described polyakane polymers, means dispersible in water to provide a visually homogeneous and transparent solution infinitely dilutable with water.

Alkenyl arylene methylene sulfonium monomers; Formula A:

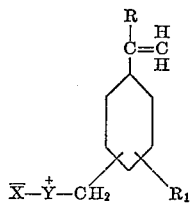

In this formula, R and $R_1$ are independently selected from the group consisting of hydrogen and methyl, Y is a divalent, sulfur-containing, organic radical having its valences on the sulfur atom, said radical being derived from acyclic and alicyclic organic sulfides having from 2 up to 8 carbon atoms, and X is a counteranion.

Illustratively, Y corresponds to the following formula:

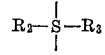

wherein $R_2$ and $R_3$ separately represent monovalent radicals such as, for example, alkyls, haloalkyls, hydroxyalkyls, carboxyalkyls, acycloxyalkyls, carboalkoxyalkyls, carbamoylalkyls, alkylcarbamoylalkyls, alkylamidoalkyls and $(C_aH_{2a}Z)_bC_aH_{2a}$-radicals wherein Z is selected from the group consisting of oxygen and sulfur, $a$ is an integer from 2 to 4, $b$ is at least 1, said monovalent radicals having from 1 up to 11 carbon atoms. Taken together, $R_2$, $R_3$ and S represent an alicyclic, saturated organic sulfide radical having from 4 to 6 ring carbon atoms which may contain such substituents as halogen, alkyl, amino, hydroxyl and the like groups. Numerous examples and preparative methods of monomers according to this formula are described in United States Patent 3,078,259.

Normally, the above-described sulfonium moiety will have a halide counteranion such as the chloride ion. If desired, however, the halide form of the sulfonium group can be converted in a conventional manner to any one of the common anionic salt forms by passing an aqueous solution of the water-soluble polymeric polysulfonium through an anion exchange resin in the proper salt form. The counteranions which can be added in this manner include such organic and inorganic anions as bromide, fluoride, iodide, sulfate, nitrate, bicarbonate, carbonate, acetate, propionate, benzoate and the like. Other anions are dihydrogenphosphate, phthalate, succinate, oxalate and maleate.

Representative of monomers according to Formula A are vinylbenzyl(dimethyl)sulfonium chloride;
vinylbenzyl(di-2-hydroxyethyl)sulfonium chloride;
vinylbenzyl(2-hydroxyethyl, ethylbenzl)sulfonium chloride;
vinlbenzyl(benzyl, methyl)sulfonium chloride;
vinylbenzyl(2-hydroxyethyl, carboxymethyl, sodium salt)sulfonium chloride;
vinylbenzyl(methyl, carboxymethyl)sulfonium chloride;
ar-vinylbenzyl(di-2-carboxyethyl)sulfonium chloride;
vinylbenzyl(methyl, carbomethoxy methyl)sulfonium chloride;
vinylbenzyl(methyl, 2-hydroxy-2-carboxyethyl, sodium salt)sulfonium chloride;
vinylbenzyl(di-2-carboxyethyl, potassium salt)sulfonium chloride;
vinylbenzyl(di-2-carbamylethyl)sulfonium chloride;
vinylbenzyl(methyl, carbamylmethyl)sulfonium chloride;
vinylbenzyl(benzyl, carboxymethyl)sulfonium chloride;

vinylbenzyl(methyl, 2-carbamylethyl)sulfonium chloride;
vinylbenzyl(2-hydroxyethyl, 2-carbamylethyl)sulfonium chloride;
vinylbenzyl(methyl, 2,3-dihydroxypropyl)sulfonium chloride;
vinylbenzyl(methyl, pentaethyleneglycol)sulfonium chloride;
vinylbenzyl tetrahydrothiophenium chloride;
vinylbenzyl(methyl, 2-hydroxyethyl)sulfonium chloride;

and the like sulfonium salts of alkenyl aromatic methylene chloride or bromide compounds.

In general, the described sulfonium salts are prepared by reacting with an alkenyl aromatic methylene chloride or bromide with a soluble organic sulfide to form the corresponding hydrophilic sulfonium group. An organic sulfide is soluble, as this qualification is intended herein, and can be employed in the preparation of the water-soluble polyalkane, with mixed onium moieties, of the invention if it is miscible with isopropanol.

Alkenyl arylene methylene quaternary ammonium monomers; Formula B:

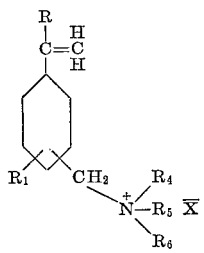

In the above formula R and R₁ are independently selected from the group consisting of hydrogen and methyl and R₄, R₅ and R₆ each represent individually a monovalent radical selected from the group consisting of $CH_2OHCH_2$—, $CH_3CHOHCH_2$—, $CH_2OHCHOHCH_2$— and alkyl, aryl, cycloalkyl and aralkyl hydrocarbon radicals, and R₄, R₅ and R₆ collectively represent the trivalent radical of the formula:

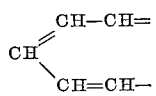

wherein the three valences are attached to the nitrogen atom, the said groups R₄, R₅ and R₆ containing a combined total of not more than 14 carbon atoms. X is an anion as defined for Formula A. Such monomers known to the art and examples of them can be found in United States Patents 2,694,702 and 3,011,918.

Illustrative monomers according to Formula B include ar-vinylbenzyl trimethylammonium chloride,
ar-vinylbenzyl trimethylammonium bromide,
ar-vinylbenzyl triethylammonium chloride,
ar-vinylbenzyl tripropylammonium chloride,
ar-vinylbenzyl dimethylbutylammonium chloride,
ar-vinylbenzyl dimethyl 2-hydroxyalkylammonium chloride,
ar-vinylbenzyl methyl di-2-hydroxypropylammonium chloride,
ar-vinylbenzyl dimethylbenzylammonium chloride,
ar-vinylbenzyl dimethylphenylammonium chloride,
ar-vinylbenzyl dimethylcyclohexylammonium chloride,
ar-vinylbenzyl dimethyldodecylammonium chloride,
ar-vinylbenzyl 2-hydroxypropyldimethylammonium chloride and
ar-vinylbenzyl pyridinium chloride.

Such alkenyl aromatic quaternary moieties as the foregoing are the reaction products of an alkenyl aromatic methylene chloride or bromide with any soluble tertiary amine whereby a water-soluble, i.e., hydrophilic quaternary group is formed. Such quaternization reactions take place with any tertiary amine having less than 14 carbons which is miscible with ethanol and which contains no more than two aromatic rings attached directly to the nitrogen.

Anions which may be present in place of the aforementioned chloride ion include any of the various anions of the oxyacids of sulfur, oxyacids of phosphorus, acetate and the like. Normally, however, special procedures will be required to prepare these anion forms of either the preparative monomers or finished polymers. Conversion from the chloride form to another salt form is accomplished by passing a solution of the monomer or polymer through an anion exchange bed in the desired salt form.

Illustrative optional vinylidene monomers; Formula C:

In this formula, M is selected from the group consisting of hydrogen and methyl and L is selected from the group consisting of carboxamide, aminoalkyl carboxylate and alkyl carboxylate groups wherein the alkyl groups have from 1 to 4 carbons and the nitrogens can have up to 12 carbons as alkyl, aryl, or aralkyl hydrocarbon substituent groups. L can also be an aryl or arylmethylene hydrocarbon of the benzene series having up to 10 carbons or a fluoro, chloro, bromo or iodo derivative of the same.

Moieties according to Formula C, which are optional in the interpolymers of the present invention, include acrylamide, methacrylamide, N-methyl acrylamide, N,N-dimethyl acrylamide, vinyltoluene, styrene, vinylbenzyl chloride, vinyl alcohol, vinyl acetate, vinyl chloride, acrylonitrile, methyl acrylate, methyl methacrylate, ethyl acrylate, butyl acrylate, 2-aminoethyl acrylate, 2-aminoethyl methacrylate, N-methyl-2 - aminoethyl acrylate, N,N-dimethyl - 2 - aminoethyl acrylate and the like water-soluble or oil-soluble vinyl polymerizable comonomers.

Interpolymers of the aforedescribed invention are prepared by a dilute solution polymerization technique. Usually, the polymers are prepared in aqueous solutions but organic solvents and mixtures thereof with water can also be employed. The polymerization solutions will usually contain anywhere from about 5 up to as much as 50 percent, or more, by weight total monomer. The lower concentration limit, however, is not critical and the indicated value only represents a practical limit. The upper concentration limit for a particular system is defined by that concentration of monomer at which excessive cross-linking, with resulting water insolubilization occurs. Water insolubilization is first evidenced by the appearance of gel particles in the polymerizate.

It is preferred to conduct the polymerization reaction under an inert gas atmosphere such as nitrogen. Temperatures employed can vary over wide ranges, but generally, best results are obtained by conducting the polymerization reaction within the temperature range from about 40° up to 90° C. Higher temperatures tend to produce cross-linking side reactions with resulting insoluble gels.

The polymerization reaction is initiated with conventional vinyl polymerization initiating means, e.g., actinic light, ultraviolet radiation, gamma radiation, and conventional chemical free radical catalyst such as the inorganic and organic peroxides.

Subsequent to the polymerization reaction, the polymer can be employed in the form of the dilute sol produced by the polymerization reaction, or if desired, the polymer can be recovered from the reaction medium as a dry solid. Recovery of the polymer can be accomplished by solvent or salt induced precipitation. Once precipitated, the polymer is easily recovered by filtration and is conveniently dried at moderate temperatures. An alternate mode of recovery of the polymer involves distillation of the reaction medium under reduced pressure. In any event when drying the polymer, it is essential to avoid excessive heating of the polymer, e.g., less than about 50° C., which causes insolubilization of the dry resin.

Another method for preparing the polymers of the invention involves first polymerizing an alkenyl arylene methylene chloride or bromide, with or without a comonomer of the Formula C, and thereafter reacting the resulting copolymer, dissolved in a dispersing medium with amounts of an organic sulfide and a tertiary amine sufficient to provide a water-soluble polymer with the desired mixture of sulfonium and quaternary ammonium moieties.

In a typical operation of the latter type, vinylbenzyl chloride is homopolymerized in a solvent for the monomer to a degree of polymerization of at least 100. Subsequently, the polyvinylbenzyl chloride is contacted with a soluble organic sulfide such as dimethyl sulfide under conditions conducive to reacting from about 10 to about 90 percent of the polymerized vinylbenzyl halide moieties to form the corresponding sulfonium moieties. Either simultaneously therewith, or as is preferred, in a subsequent operation, the copolymer which, at this stage corresponds to a copolymer of vinylbenzyl dimethyl sulfonium chloride and vinylbenzyl chloride moieties is reacted with a soluble tertiary amine such as trimethylamine whereby remaining interpolymerized vinylbenzyl halide moieties are quaternized. The combined reactions provide a water-soluble interpolymer containing a plurality of vinylbenzyl sulfonium and vinylbenzyl quaternary ammonium moieties.

The foregoing procedure is readily modified by incorporating into the initial homopolymerization system for the vinylbenzyl chloride up to 40 mole percent of an optional monomer of Formula C. Preferably, such optional monomers are essentially oil soluble, i.e., having a mutual compatibility with the vinylbenzyl halide in organic solvents inert to the monomers. The resulting modified interpolymers containing one or more of the optional comonomers of Formula C are subsequently reacted with the sulfide and tertiary amine as aforedescribed.

A preferred method for the manufacture of interpolymers under the invention, involves first preparing an organic solvent soluble, chloromethylated derivative of polystyrene or poly-α-methylstyrene containing an average from 0.5 up to 1 chloromethyl group per polymerized styrene moiety. These polymer products are prepared according to procedures described in United States Patent 2,694,702. Having prepared such soluble polymers, the interpolymers of the invention are prepared by reacting the soluble polymers with suitable amounts of the sulfides and tertiary amines to form the described polymers of mixed onium moieties.

Whenever the onium forming reactions are carried out on a polymer containing interpolymerized alkenyl arylene methylene halide moieties, the reaction is preferably carried out as a solution reaction in an inert organic reaction medium miscible with water. The proportion of sulfide to be reacted with the polymer was computed on the basis of the chloromethyl groups available for reaction. After determining the total of such groups in the polymer, the amount of the organic sulfide contacted with the polymer is sufficient to react with at least about 10 mole percent of the available chloromethyl groups. A greater amount of the sulfide can be employed, but in such instances, the course of the reaction must be followed so that it can be terminated prior to completion in order to leave halomethyl groups available for reaction with a tertiary amine. The reaction is terminated by the addition of cold water. Either simultaneously with the reaction of the sulfide, or for better process control, subsequent thereto, an amount of the water-soluble tertiary amine sufficient to react with the remaining chloromethyl groups is added to the system. Upon completion of this reaction, a water-soluble polymer having the desired mixed sulfonium and quaternary ammonium moieties is obtained in the form of a dilute sol. If desired, the polymer can be recovered from the reaction medium by one of the techniques described for the recovery of directly polymerized products.

Normally, the sulfide is more slowly reacting than the tertiary amine. As a result, the sulfide is conventionally reacted at temperatures within the range from about 20° to 70° C. Solvents desirable as dispersing mediums for the sulfide reaction, particularly when high molecular weight sulfides are involved, include isopropanol, acetone, mono- and diethyl ethers of diethylene glycol. Since the reaction of the tertiary amine generally proceeds more rapidly than with the addition of the sulfides, this reaction can be accomplished at temperatures of as low as 0° C. Higher temperatures, e.g., up to 60° C., can be employed. The higher molecular weight tertiary amines are slower in reacting with the benzylic halide and it may be desirable in some instances to employ even higher temperatures to promote quaternization.

The following examples are illustrative of the interpolymers prepared in accordance with the invention and their utilization as starting materials for the preparation of water-insoluble ion selective membranes, as electroconductive coatings for electrographic paper and as paper furnish additives to improve the wet strength of paper while minimizing sizing in the finished paper.

*Example 1*

To a 20-gallon glass lined reactor equipped with cooling means was charged 67.7 pounds of chloromethyl methyl ether. The chloromethyl methyl ether was cooled to 10° C. and 2,210 grams of zinc oxide was added to the ether. Subsequently 47.5 pounds of ethylene dichloride and 25 pounds of polystyrene having a molecular weight of about 20,000 were added to the reactor. The resulting mixture was gently stirred to promote dissolution of the polymer, and after a few minutes the reactor contents were heated to 45° C. and maintained thereat for 17 hours. Then, the reaction mixture was cooled to about 26° C. and 33.8 pounds of ethylene dichloride and 52.5 pounds of wash water were metered into the reactor. The wash water was separated from the product and the washing sequence with water repeated a total of 5 times. Residual water in the organic phase was removed by centrifugation.

The organic product consisted essentially of an ethylene dichloride solution of polystyrene chloromethylated to the extent of about 80 percent of the available aromatic moieties, i.e., 80 percent chloromethylated polystyrene. This solution was pumped back into the aforementioned reactor and reheated at 40° C. at which point 11.7 pounds of thiodiglycol were slowy added to the solution. The temperature of the resulting mixture was increased to 50° C. and 29.2 pounds of isopropanol were added slowly. After one hour, 75 pounds of water, 1 pound of 50 percent aqueous caustic, and 29.4 pounds of a 25 percent by weight aqueous solution of trimethylamine were added. The reaction system was then maintained at 40° C. for 1.5 hours after which the temperature was increased to 50° C., and the isopropanol, ethylene dichloride and excess trimethylamine were removed by distillation under reduced pressure over a period of two hours.

The product remaining in the reactor was dissolved in 75 pounds of water to provide a clear and visually homogeneous solution. A portion of the foregoing polymer solution was evaporated to dryness at an elevated temperature above 100° C. The resulting dried polymer was insoluble in water. Elemental analysis of the dried polymer indicated the presence of about 3.2 percent nitrogen, 2.5 percent sulfur, 11.3 percent chlorine, 10.5 percent ionic chlorine, 64.9 percent carbon, 8.0 percent hydrogen and 9.3 percent volatile matter. The foregoing percent values are based on starting material weight and each value reported is an average of two analyses.

Based upon the foregoing analytical data and 80 percent chloromethylation of thhe starting polymer, the polymer product, before drying at the elevated temperature, corresponded to a polymer containing in polymerized form about 19 mole percent bis(2-hydroxyethyl) ar-vinylbenzyl sulfonium chloride, 56 mole percent ar-vinylbenzyl trimethylammonium chloride, 5 mole percent of ar-vinylbenzyl chloride and 20 mole percent styrene.

*Example 2*

In a similar manner to that of the foregoing example, a polystyrene having a molecular weight of about 20,000 was chloromethylated to the extent of about 80 percent of the available aromatic moieties. This polymer was reacted, in the presence of ethylene dichloride and water, with sufficient thiodiglycol and trimethylamine to form a polymer containing about 20 mole percent styrene, 27 mole percent bis(2 - hydroxyethyl) ar - vinylbenzyl sulfonium chloride, 40 mole percent trimethyl ar-vinylbenzyl ammonium chloride and 13 percent ar-vinylbenzyl chloride.

The above-prepared polymer was employed as an electroconductive base coating for paper over which a photoconductive coating was later applied. To this end several sheets of a paper stock were coated with an aqueous solution containing about 10 percent by weight of the above polymer (hereinafter Polymer A). In a comparative operation, additional sheets of the paper stock were coated with a similar solution of a water-soluble copolymer of essentially 80 mole percent trimethyl ar-vinylbenzyl ammonium chloride and 20 mole percent styrene (hereinafter Polymer B). The latter product corresponds to an electroconductive polymer coating described in United States Patent 3,011,118. After application of the polymer coatings, the papers were dried at 105° C. The pick up for each of the polymers applied was 5 percent by weight based on the weight of the dry paper.

Over the electroconductive base coating on each paper sheet was applied a photoconductive composition comprising zinc oxide and a styrene-butadiene latex in the form of an aqueous dispersion. For the purposes of comparison, additional paper stock was coated with the photoconductive composition without prior application of an electroconductive base coating. The coated papers were again dried at 105° C.

The coated surfaces of the three types of papers were subsequently subjected to a negative corona charge of about 7,000 volts and the uncoated undersides of the papers were subjected to a positive corona charge of 2,500 volts. The charged sheets were immediately printed, one sheet of each of the three types being printed, at relative humidities of about 26 and 64 percent at normal room temperature. Printing was accomplished by exposing the sheets to a 60-watt tungsten bulb approximately 12 inches above the paper through a positive transparency for one second.

The paper with the electroconductive base coating consisting of Polymer A produced a fair image with sharp contrast at both humidities. It had no back printing and the image was quite uniform. The paper with the base coating consisting of Polymer B of the prior art had a faint print at 24 percent relative humidity and essentially no print at 68 percent relative humidity. The weakness of the latter images was apparently due to transference of the water-soluble electroconductive coating into the subsequently applied aqueous photoconductive coating. The paper printed without any electroconductive base coat produced a print with fair contrast but was characterized by back printing and a mottled appearance at both 26 and 64 percent relative humidities. Back printing is the appearance of discoloration and inverted images on the reverse side of the paper.

From the foregoing data, it is apparent that the special mixed quaternary ammonium and sulfonium polymers of the invention can be employed as a dip base coating for the subsequent application of aqueous photoconductive coatings. Although the invention is not predicated upon theory or understanding as to the mechanism whereby these advantages are produced, polymer migration between coatings is apparently prevented by the insolubilization of the mixed polymers upon drying.

*Example 3*

To a one-liter, 3-neck glass reactor equipped with a stirrer and thermometer was charged 200 grams of a 35.5 percent by weight solution of an 80 percent chloromethylated polystyrene in ethylene dichloride. The solution was heated at 55° C., and at this point 52.9 grams of the diethyl ether of diethylene glycol were added. Subsequently, 50 grams of thiodiglycol were slowly added to the mixture.

The ethylene dichloride was then removed from the reaction mixture by distillation under reduced pressure. Toward the end of the distillation operation, 300 milliliters of deionized water were added to the solution, and the remaining ethylene dichloride was removed as an azeotrope with water.

The solution remaining in the distillation flask was then divided into two equal parts which were charged to one liter flasks. To one flask was added 13.6 grams of triethylamine with the resulting formation of a clear viscous solution. Eighteen grams of dimethyl ethanolamine were added to the second flask to prepare a similar clear solution.

The first polymer solution comprised essentially a terpolymer of 12 mole percent of ar-vinylbenzyl triethylamine chloride, 68 mole percent bis(hydroxyethyl) ar-vinylbenzyl sulfonium chloride and 20 mole percent styrene (hereinafter Polymer C). The second polymer solution comprised a similar terpolymer except that the quaternary ammonium moieties were the polymerized form of ar-vinylbenzyl N,N'-dimethyl ethanolammonium chloride (hereinafter Polymer D).

Aqueous solutions of these polymers were added to furnish used to prepare test paper handsheets. Sufficient amounts of the polymers were individually added to separate aliquots of a hardwood soda pulp beaten to 400 milliliters Canadian standard freeness to provide a resin content of one percent by weight, based on the dry weight of the fibers. The fiber suspensions were then used to prepare paper handsheets by a standard test procedure. After drying at an elevated temperature of about 105° C., the handsheets were tested to determine their wet strength, i.e., breaking length in meters. Handsheets containing Polymers C and D, respectively, were characterized by breaking lengths of 550 and 130 meters, respectively. A control handsheet without polymer had a breaking length of only 70 meters. The breaking length was measured according to a standard test procedure.

*Example 4*

To illustrate the film forming properties of polymers according to the present invention, aqueous solutions of the above-described Polymer A and Polymer B resins were applied to glass plates. The resulting aqueous films were dried for two minutes at 110° C. The dried weight of the films was then determined by weighing the coated glass plates and subtracting the tare weight of the plates. The coated plates were placed in distilled water at room temperature for 5 minutes. Upon removal, the plates were dried for 5 minutes at 110° C. and reweighed to ascertain the extent of resin loss. Polymer A of the present invention was retained 100 percent. Polymer B was nearly completely dissolved, i.e., 85 percent weight loss or more.

To prepare anion permselective membranes for employment in dialysis operations, aqueous films of polymers according to the invention, inclusive of the polymers prepared in Examples 1, 2 and 3, are cast on glass plates. The films are dried at a moderate elevated temperature of about 100° C. The dried film thus formed is readily separated from the glass. Such films are insoluble in water but they imbibe water to produce bibulous membranes permselective to the passage of anions. Without the employment of modifying plasticizers, the films thus prepared will be quite brittle when completely dry. Thus in the preparation of the bibulous films, it is highly desirable once the film has sufficiently dried to become insoluble to rewet it slightly prior to moving it from the supporting substrate. Improved strengths are also achieved in the membranes by building up multiple layers of films with intervening drying operations until a desired thickness is achieved.

What is claimed is:

1. A water-insoluble bibulous film obtained by drying an aqueous film, at a temperature of at least 50° C., of a water-soluble, polyalkane backbone polymer of monoethylenically unsaturated monomers characterized in that at least 60 mole percent of the polymerized moieties forming the polyalkane are vinylidene polymerized forms of hydrophilic alkenyl arylene methylene ammonium and alkenyl arylene methylene sulfonium moieties, these two moieties being present in relative proportions of from about 0.1 to about 9 parts by weight of the former for each part by weight of the latter.

2. A method for the preparation of a water-soluble, polyalkenyl aromatic polymer of the benzene series containing interpolymerized forms of mixed hydrophilic, alkenyl arylene methylene sulfonium and hydrophilic, alkenyl arylene methylene quaternary ammonium moieties; which comprises chloromethylating a polyalkenyl aromatic polymer of the benzene series to an extent of introducing from about 0.6 to about 1 chloromethyl group per aromatic ring and thereafter reacting the chloromethylated polymer with a sufficient amount of an organic sulfide soluble in isopropanol to react with from about 10 up to 90 mole percent of the available chloromethyl groups and reacting the remaining chloromethyl groups with a tertiary amine having less than 14 carbons and having no more than two aromatic rings attached directly to the nitrogen; whereby the desired water-soluble polyalkenyl aromatic polymer is obtained.

References Cited
UNITED STATES PATENTS

| | | | |
|---|---|---|---|
| 2,632,001 | 3/1953 | McMaster et al. | 260—2.1 |
| 2,823,201 | 2/1958 | Wheaton | 260—881 |
| 2,895,925 | 7/1959 | Hwa | 260—2.1 |
| 3,011,918 | 12/1961 | Silvernail et al. | 96—1 |
| 3,130,117 | 4/1964 | Humiston et al. | 260—79.7 |
| 3,248,279 | 4/1966 | Geyer | 117—201 |

WILLIAM H. SHORT, *Primary Examiner.*

C. A. WENDEL, H. D. ANDERSON,
*Assistant Examiners.*